United States Patent [19]

Hains

[11] Patent Number: 5,291,296
[45] Date of Patent: Mar. 1, 1994

[54] SPECIFIC SET OF ROTATED SCREENS FOR DIGITAL HALFTONING

[75] Inventor: Charles M. Hains, Altadena, Calif.

[73] Assignee: Xerox Corporation, Stamford, Conn.

[21] Appl. No.: 954,092

[22] Filed: Sep. 29, 1992

[51] Int. Cl.$^5$ .................. H04N 1/40; G03G 15/06
[52] U.S. Cl. ...................... 358/298; 358/456; 358/536; 355/245
[58] Field of Search ............... 358/298, 456, 457, 75, 358/455, 534, 535, 536; 355/245

[56] References Cited

U.S. PATENT DOCUMENTS

| | | | |
|---|---|---|---|
| 4,149,183 | 4/1979 | Pellar et al. | 358/75 |
| 4,185,304 | 1/1980 | Holladay | 358/298 |
| 4,770,964 | 9/1988 | Fender | 430/65 |
| 4,828,953 | 5/1989 | Oka et al. | 358/245 X |
| 4,847,657 | 7/1989 | Hanada et al. | 355/245 X |
| 4,897,736 | 1/1990 | Sugino | 358/457 |
| 4,901,114 | 2/1990 | Parker et al. | 355/245 |
| 4,918,622 | 4/1990 | Granger et al. | 358/298 X |
| 4,924,301 | 5/1990 | Surbrook | 358/75 |
| 5,053,887 | 10/1991 | Thompson | 358/457 |
| 5,103,265 | 4/1992 | Kohyama | 355/245 X |
| 5,166,809 | 11/1992 | Surbrook | 358/456 |

Primary Examiner—Benjamin R. Fuller
Assistant Examiner—Eric Frahm
Attorney, Agent, or Firm—Robert Cunha

[57] ABSTRACT

A set of halftone screens and a write white xerographic system for generating halftone images with a minumum of artifacts. The screens used in a four color printer have at least 64 pixels per pattern and are distributed to creat fourcentered dots that are at either −14, 0, +14 or +45 degrees. The xerographic process involves charging the photoreceptor, partially discharging the photoreceptor with a scanning beam to create an image, and then using toner which adheres to the charged portions of the photoreceptor to create the hard copy.

2 Claims, 8 Drawing Sheets

SPECIFIC SET OF ROTATED SCREENS FOR DIGITAL HALFTONING

BACKGROUND OF THE INVENTION

This is a method for generating a multi-centered halftone pattern, having a number of dots in a repeating pattern, in combination with a "write white" xerographic process to minimize visible artifacts in the printed output.

In the standard laser printer which uses the xerographic process to produce a printed page, the photoreceptor is charged up to a uniform voltage, and then a laser is used to discharge the photoreceptor to form the image. It is possible to have the laser discharge the areas that are to be black, "write black", or to discharge the areas that are to be white, "write white". Write black printers are preferred in the digital printing industry since this type results in a cleaner output hard copy. That is because, to the extent that the laser misses a spot because of dust or dirt, the artifact will appear on the output as a white spot. Since the printed material is most often black text on white paper, a white artifact will be less obvious. Also, as will be explained below, isolated black pixels in a write black system are larger than they should be, thus making a black line one pixel wide more visible than it would otherwise be. In a write black system, toner which is charged to a voltage similar to that of the charged photoreceptor is then applied to the photoreceptor. Because of the potential differences, the toner will adhere where the receptor is discharged and not adhere where there is a voltage. The resultant toner image on the receptor is then transferred to a piece of paper to create the output hard copy.

Figure 1:
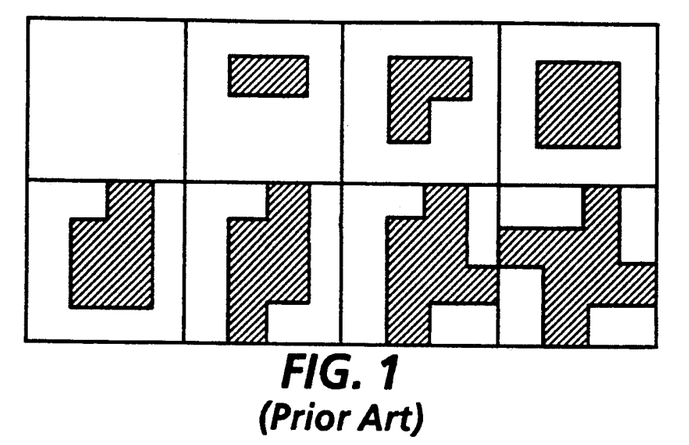
FIG. 1 is a diagram of a prior art four by four pixel halftone pattern.

This xerographic process reliably produces dots that are either completely black or completely white, but usually can not accurately produce gray levels. Therefore, to create the appearance of gray levels, a halftone pattern is commonly used in xerographic printers to show gray scale pictures. A halftone matrix is usually a square composed of a number of pixels. As a numerical example, let us assume a square of four pixels by four pixels, eight of which, varying from light to dark gray, are shown in FIG. 1. Now, to create the appearance of white, all pixels are white. To create the appearance of lighter shades of gray, one, two three or four of the internal pixels can be black and the outer pixels can be white. The result is a black dot in the middle of the square. Subsequently, continuing to make the outer pixels black will continue to make the square darker, until the point is reached where all of the pixels are black. In appearance, the process is that of having a white square with a central black dot. By making the dot either smaller or larger, the color of the overall appearance can be made to look lighter or darker.

A problem with this arrangement is that there are only 17 levels of gray that can be reproduced, the number being limited by the number of pixels that can be turned on in a four by four pixel square. In the halftone rendition of a gray scale image, there will be a visible contour artifact at those points in the picture where there is a change from one gray level to another.

Figure 2:
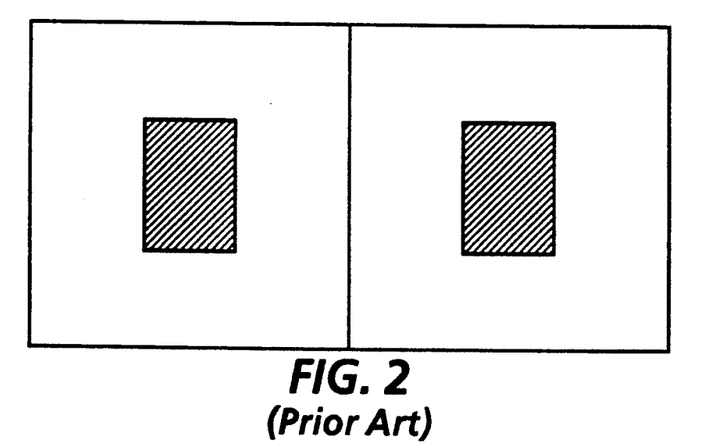
FIG. 2 is a diagram of a prior art eight by eight pixel halftone pattern.

This problem can be reduced by going to a larger square. For example, an eight by eight pixel square will have 65 levels of gray. See FIG. 2 which shows two such squares, each having six black pixels. With 65 levels, the changes in darkness from one level to another will have become less visible to the eye. However, with such a large square, the size of the dot and the space between dots also become bigger, so that the resultant image coarseness becomes more visible.

Figure 3:
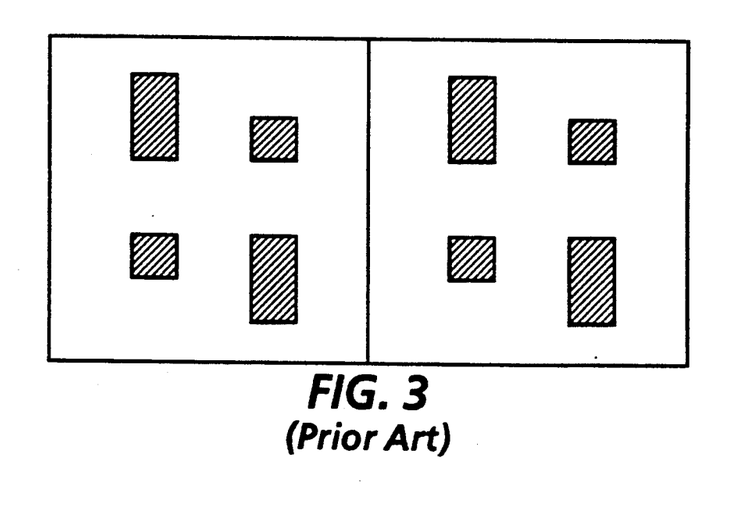
FIG. 3 is a prior art diagram of a four centered dot pattern.

One solution to this problem is to use a multicentered dot as in FIG. 3. In both FIGS. 2 and 3, each eight by eight pixel dot has six ON pixels, but in the FIG. 3 version there will be four dots within each square instead of one. This arrangement doubles the number of dots per inch in each direction, and the dot size and the distance between dots is smaller, so the result has fewer visible contours and looks less grainy, while still maintaining a large number of gray levels. This is therefore an improvement over both systems described above.

However, a close inspection of the output picture will still show a slight pattern of graininess or visible texture at light shades of gray. Here, the eye is detecting the pattern of one dot being slightly larger and the next being slightly smaller. One method that has been tried to obscure this artifact is to assign pixels to the dots in a slightly random pattern instead of in the regular pattern as shown here. This method is successful in breaking up, and therefore obscuring, the pattern, but does not preserve the uniform density that a flat color should have, the result being a picture that has a splotchy appearance.

An additional characteristic of the eye is that it is more sensitive to these artifacts at the lighter shades of gray. Therefore, what is needed is a system which keeps the regular multicentered halftone pattern, but which reduces its obviousness, especially at the lighter shades of gray. In addition, the system should also be adaptable to four color printing.

SUMMARY OF THE INVENTION

The artifact found in pictures which use multi-centered halftones can be reduced by using a "write white" xerographic system. Here the toner is charged to a potential similar to that of the discharged portions of the photoreceptor. Now the toner adheres to the charged parts of the receptor, and the final output hard copy will be black where the receptor was not discharged by the laser. In effect, the laser erases portions of the receptor, and the black portions remain after the exposure to the laser. These two systems are contrasted in FIGS. 4, 5 and 6.

Figure 4:
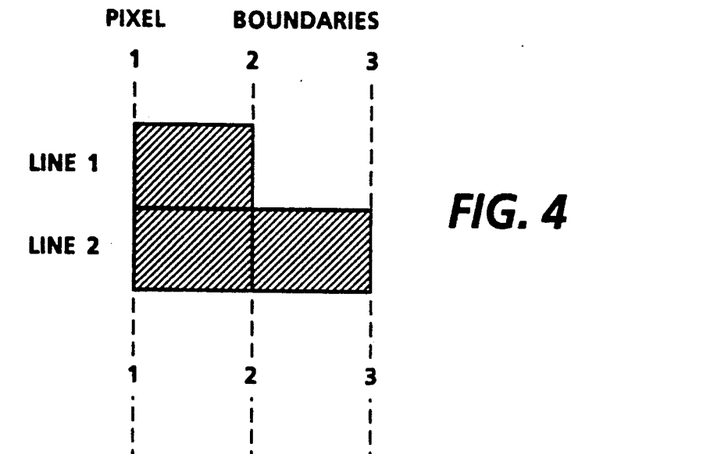
FIG. 4 is a diagram of an idealized dot pattern.
Figure 5:
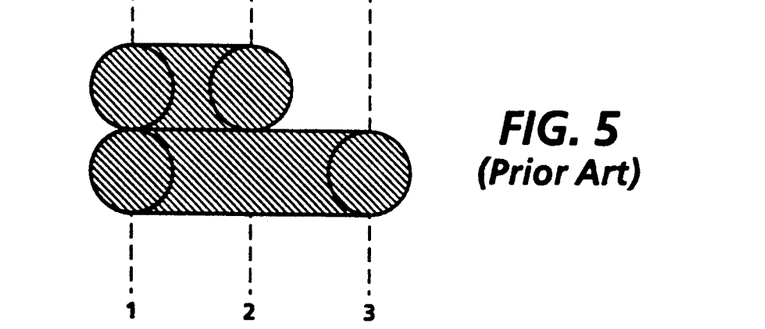
FIG. 5 is a diagram of a write black dot pattern.

FIG. 4 is an idealized picture of three pixels, one on line 1 and two on line 2. What these pixels actually look like when produced by a write black system is shown in FIG. 5. The laser beam is turned on when the center of the beam is located at pixel boundary 1. However since the beam has a radius, the entire circle at the left end of the pixel is illuminated and discharged. The laser stays ON until the center of the beam reaches pixel boundary 2. Here again, because of the of the radius of the circular beam, the entire area of the circle at the right end of the pixel is also illuminated and discharged. Toner is then applied to the discharged portions. The result is a pixel that is considerably larger than it should be. This is called "dot gain".

Figure 6:
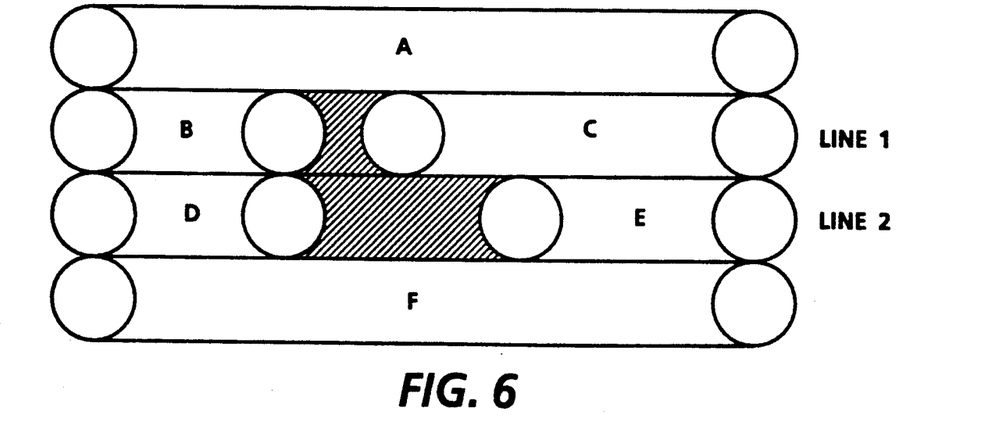
FIG. 6 is a diagram of a white white dot pattern.

The opposite effect results in a write white system where the beam actually erases areas on the receptor, and the area remaining is printed in black, as shown in FIG. 6. In this case, to print the same three pixels, the system must erase all of the areas marked A through F. Also, the beam will stay ON on lines 1 and 2 until it reaches the pixel boundary 1, erasing all of the areas in the circles at the left ends of the two pixels. Similarly, there is an erasure of the area within the circles at the right ends when the laser turns ON again. Toner is then applied to the areas not discharged. The result is that isolated black pixels are smaller in a write white system than they are in a write black system, the difference between light gray dots and white dots is less, and the artifact illustrated in FIG. 3 is less noticeable.

By the same reasoning, in a write white system, an isolated white dot is correspondingly larger than it should be against a black background. However, this effect is not as visible as its black-dot counterpart since, as stated above, the human eye is more sensitive to density variations for lighter shades of gray and therefore, a relatively large isolated white dot against black background would generate a dark gray, for which the eye is less sensitive. Therefore, these overly large white dots do not materially detract from the appearance of the image.

DETAILED DESCRIPTION OF THE INVENTION

Figures 7, 8:
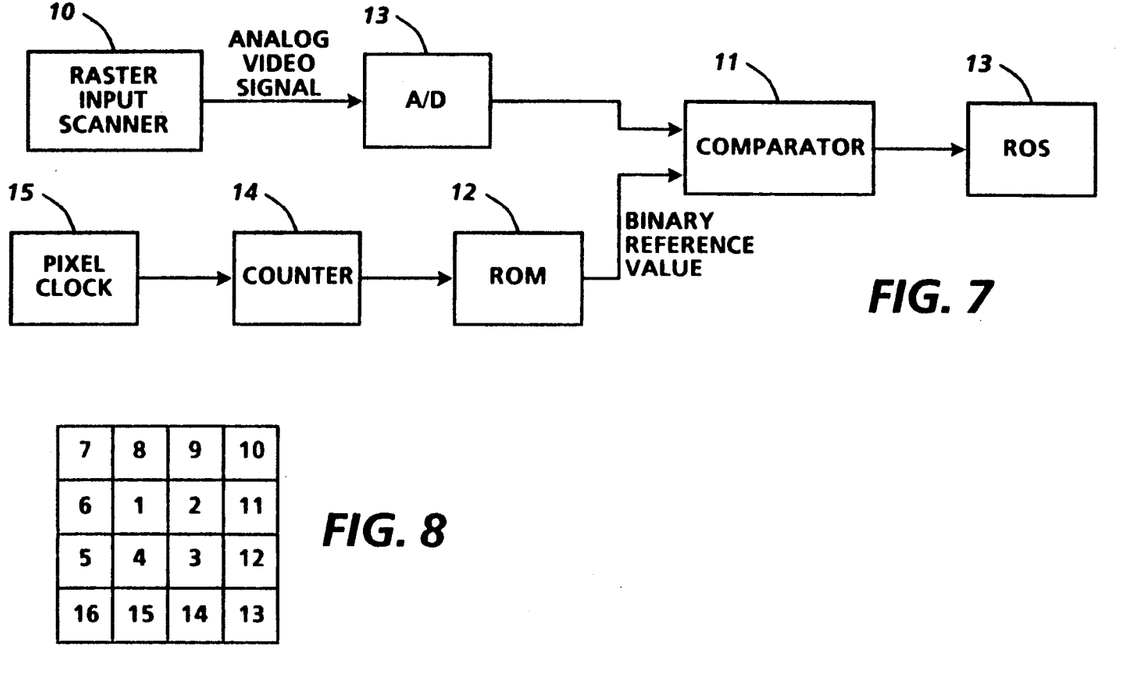
FIG. 7 is a block diagram of the system.
FIG. 8 is a possible four by four pixel set of threshold values.

FIG. 7 is a block diagram of the hardware components required. A raster input scanner (RIS) 10 scans a picture and produces an analog gray scale output which is converted to a digital gray scale level at the Analog to Digital converter 13 and output to the comparator 11. At the same time the pixel clock generator 15 drives a counter 14 to address the ROM 12 which outputs the current reference value. Finally the reference and the gray scale output are compared at comparator 11 to produce the halftoned output to the ROS 13. In the aternative, the counter and ROM could be replaced by a set of circular registers which store the successive binary reference values.

FIG. 8 shows a simple halftone pattern which could be stored in four circular shift registers, the first storing the values 7, 8, 9 and 10; the second storing the values 6, 1, 2 and 11, etc. The first value output by the RIS is compared to the value 7 at the comparator, the second RIS output is compared to the value 8, etc, until the first line is completed. Then the process is restarted for the second line and the values 6, 1, 2 and 3. The result will be a page of halftone dots, each within a four by four pixel square, lined up in vertical columns and horizontal rows. Using this system, all 4 by 4=16 values will have to be stored in the registers. However, as described above, this dot pattern is not suited to commercial color printers because of the insufficient number of levels, resulting in a contour artifact.

An ideal arrangement for a four color printer would be four, four-centered halftone dots of at least 64 pixels per pattern, arranged in rows that were −15, 0, +15 and +45 degrees from the horizontal, one for each color. However, because of the limitation in the number of pixels per pattern, in the actual best mode contemplated by the inventor, the magenta dots would be at +14 degrees, cyan at −14, yellow at 0 and black at +45.

Figure 9:
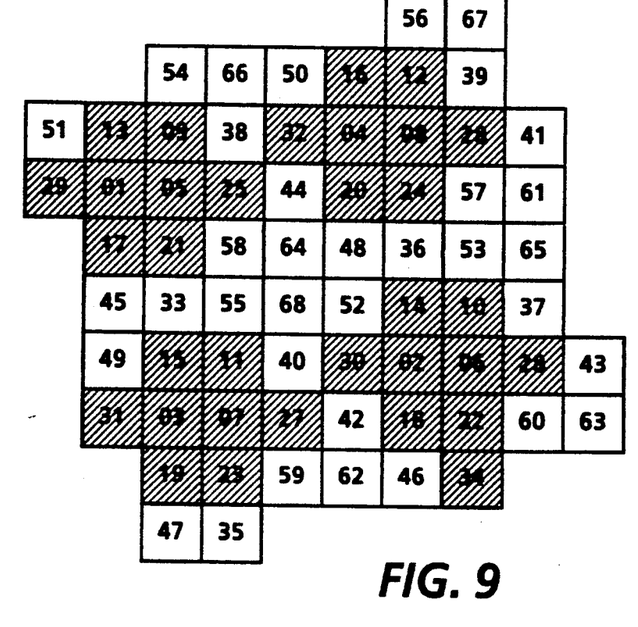
FIG. 9 is a four-centered +14 degree dot pattern.

The arrangement of a magenta, four centered halftone pattern is shown in FIG. 9. From this figure it is clear that there are four centers to the pattern, but the remaining characteristics are not clear. To more clearly see that the angle of the dots with respect to horizontal is +14 degrees, and that only two circular shift registers are required to store the 8 by 8=64 threshold values, study of FIG. 10a, which shows how a number of these patterns interlock, is required.

Figure 10A:
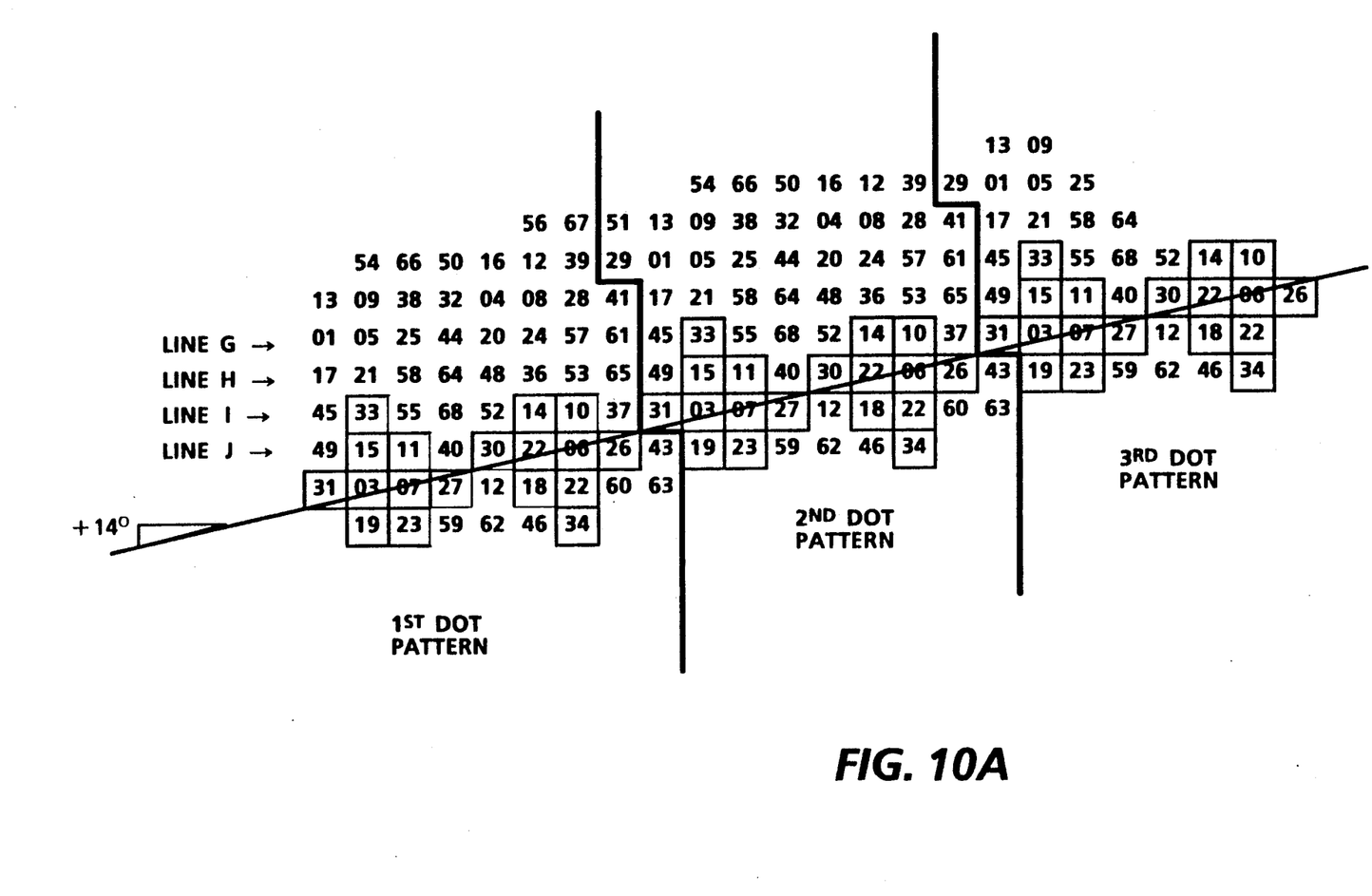
FIG. 10a is a diagram showing how the four-centered dot patterns fit together.

In FIG. 10a, the lower two dots of three dot patterns are shown. Here the angle of +14 degrees can be clearly seen.

Figure 10B:
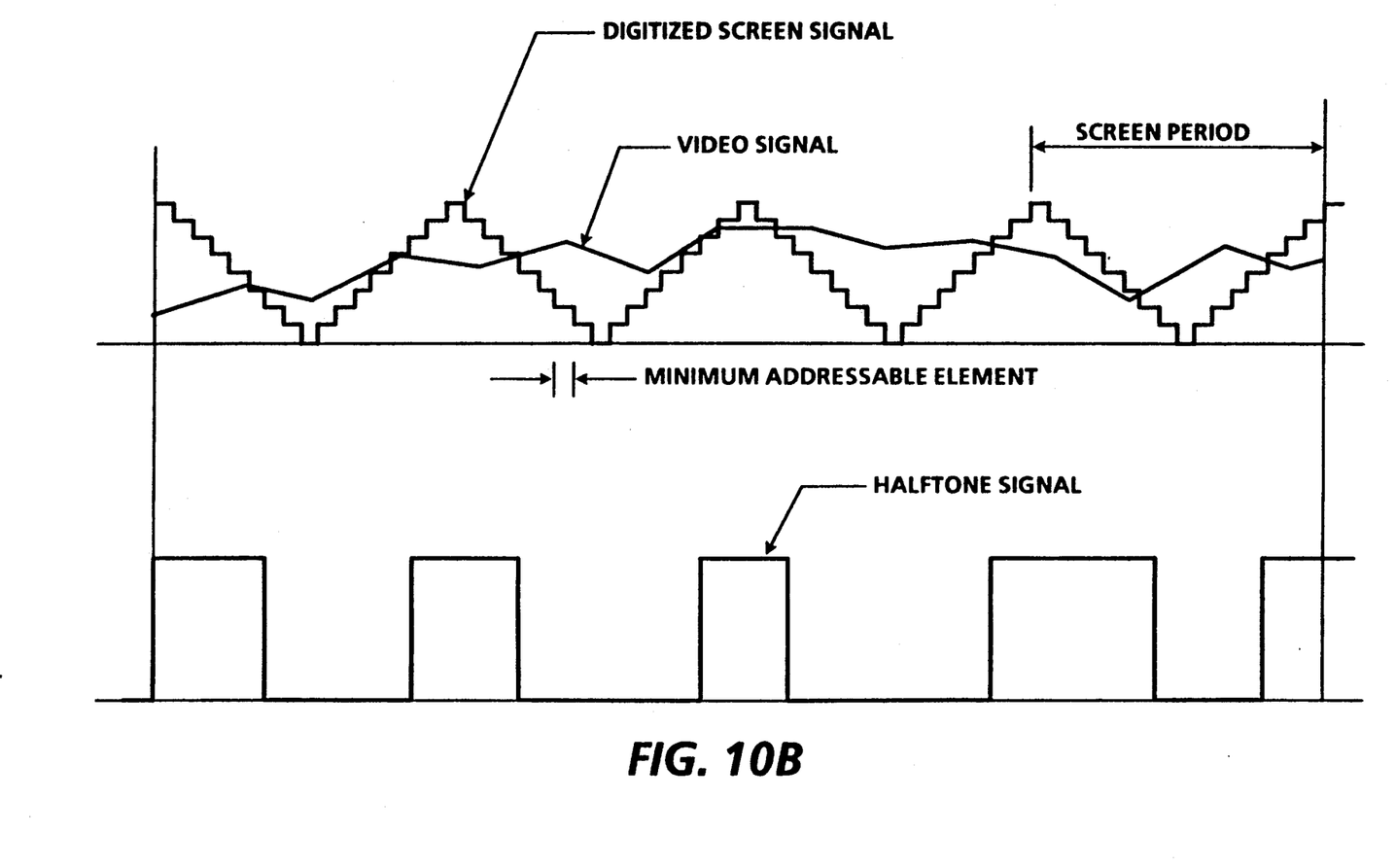
FIG. 10b is a timing diagram showing how the screen and video signals are combined to form halftone dots.

FIG. 10b shows the process by which a set of dots like that shown in FIG. 10a results in a halftone pattern. Each minimum addressable element of the video signal is compared to the threshold level of that matrix element or digitized screen signal. As shown, the output halftone signal is ON when the video signal is larger and is OFF when the video signal is smaller than the screen signal.

To reproduce line G, as shown in FIG. 10a, the following string of threshold numbers must be stored in a circular shift register (or ROM):

1, 5, 25, 44, 20, 24, 57, 61, 45, 33, 55, 68, 52, 14, 10, 37, 31, 3, 7, 27, 42, 18, 22, 60, 63, 47, 35, 54, 66, 50, 16, 12, 39, 29, the cycle repeating after 34 pixels.

To produce line H, the following string of threshold numbers must be stored in a circular shift register:

17, 21, 58, 64, 48, 36, 53, 65, 49, 15, 11, 40, 30, 2, 6, 26, 43, 19, 23, 59, 62, 46, 34, 56, 67, 51, 13, 09, 38, 32, 4, 8, 28, 41, this cycle also repeating after 34 pixels.

To produce line I, the numbers of line G are used, except that they are offset by eight pixels. Therefore the numbers of the first register need only be shifted to the left eight places and can be used for line I. Similarly the line J values are the same as those for line H, but shifted 8 places. Therefore, only two registers, each containing 34 values, are required. The result is a screen where the highest visual repeat pattern has an angle of −14°, and a frequency of 72.8 dots per inch when used with 300 lines per inch resolution. A more complete description of this method of producing halftone patterns is contained in U.S. Pat. No. 4,185,304, and is incorporated by reference herein.

The remaining dot patterns are similarly produced. The Cyan dot pattern consists of 68 levels in a rectangular brick 34 pixels by 2 pixels having the following turn on sequence;

29, 39, 12, 16, 50, 66, 54, 35, 47, 63, 60, 22, 18, 42, 27, 07, 03, 31, 37, 10, 14, 52, 68, 55, 33, 45, 61, 57, 24, 20, 44, 25, 05, 01

Figure 11:
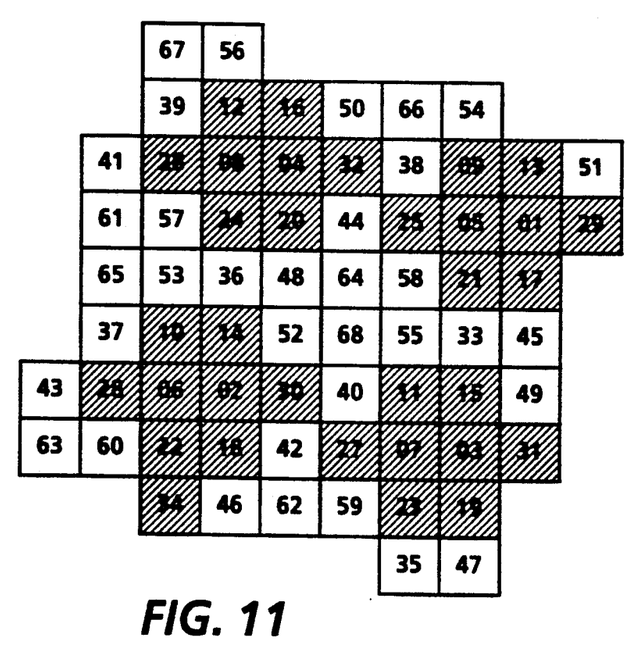
FIG. 11 is a four-centered −14 degree dot pattern.

41, 28, 08, 04, 32, 38, 09, 13, 51, 67, 56, 34, 46, 62, 59, 23, 19, 43, 26, 06, 02, 30, 40, 11, 15, 49, 65, 53, 36, 48, 64, 58, 21, 17 and a shift parameter of 26 pixels to the right. This will generate a square dot with the pattern of turn-on sequence shown in FIG. 11. The first 34 levels in the turn-on sequence are highlighted. The result is a screen where the highest visual repeat pattern has an angle of −14°, and a frequency of 72.8 dots per inch when used with 300 lines per inch resolution.

Figure 12:
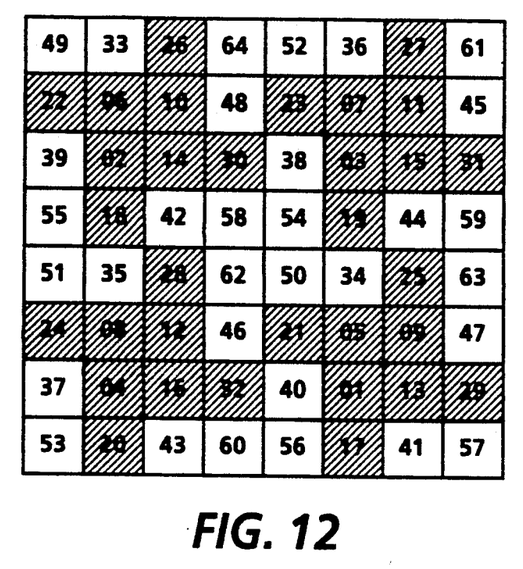
FIG. 12 is a four-centered 0 degree dot pattern.

The yellow dot pattern consists of 64 levels in a rectangular brick 8 pixels by 8 pixels having the following turn on sequence;

```
01, 13, 29, 37, 04, 16, 32, 40,
17, 41, 57, 53, 20, 43, 60, 56,
36, 27, 61, 49, 33, 26, 64, 52,
07, 11, 45, 22, 06, 10, 48, 23,
03, 15, 31, 39, 02, 14, 30, 38,
19, 44, 59, 55, 18, 42, 58, 54,
34, 25, 63, 51, 35, 28, 62, 50,
05, 09, 47, 24, 08, 12, 46, 21
``` and no shift parameter. This will generate a square dot with the pattern of turn-on sequence shown in FIG. 12. The first 32 levels in the turn-on sequence are highlighted. The result is a screen where the highest visual repeat pattern has an angle of 0°, and a frequency of 75 dots per inch when used with 300 lines per inch resolution.

Figure 13:
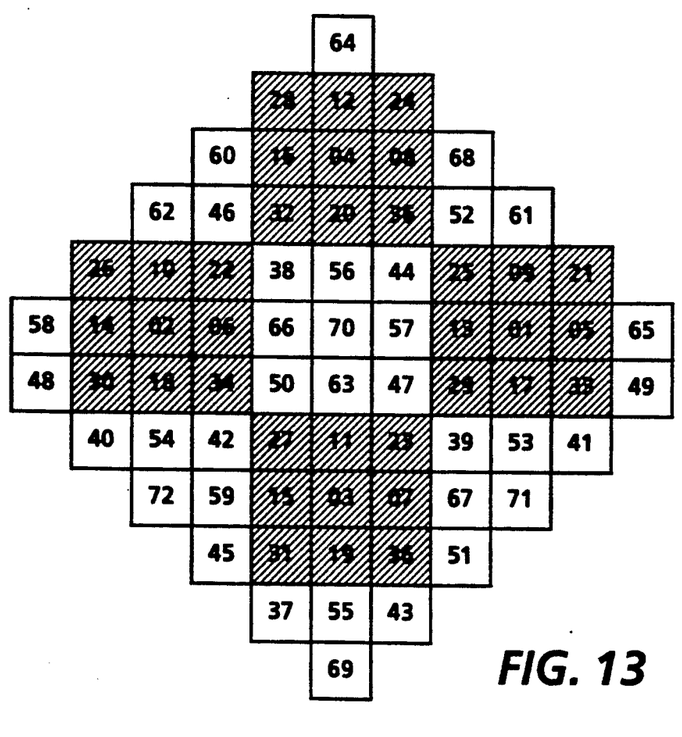
FIG. 13 is a four-centered 45 degree dot pattern.
Figure 14A:
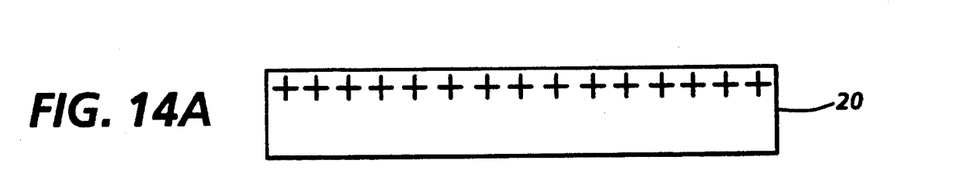
FIG. 14 is a diagram of the photoreceptor and toner in a write white system.
Figure 14B:
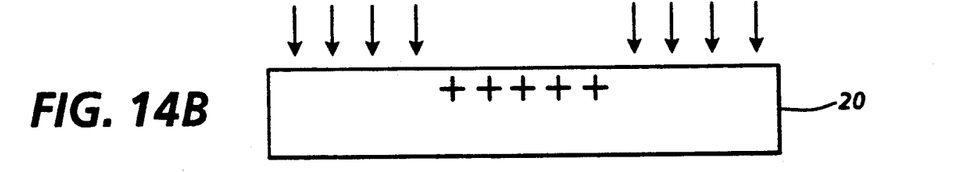
Figure 14C:
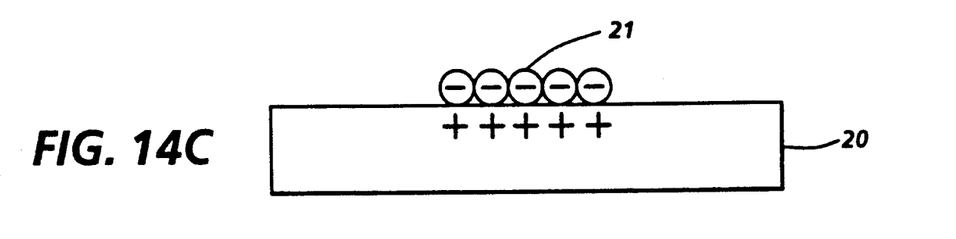
Figure 14D:
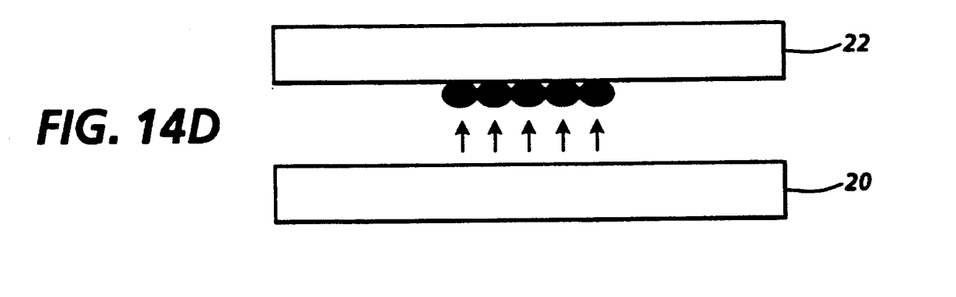

The black dot pattern consists of 72 levels in a rectangular brick 12 pixels by 6 pixels having the following turn on sequence;

```
47, 29, 17, 33, 49, 64, 48, 30, 18, 34, 50, 63,
23, 39, 53, 41, 28, 12, 24, 40, 54, 42, 27, 11,
07, 67, 71, 60, 16, 04, 08, 68, 72, 59, 15, 03,
35, 51, 62, 46, 32, 20, 36, 52, 61, 45, 31, 19,
43, 26, 10, 22, 38, 56, 44, 25, 09, 21, 37, 55
``` and a shift parameter of 6 right or left. This will generate a square dot with the pattern of turn-on sequence shown in FIG. 13. The first 36 levels in the turn-on sequence are highlighted. The result is a screen where the highest visual repeat pattern has an angle of 45°, and a frequency of 70.7 dots per inch when used with 300 lines per inch resolution.

The dot patterns for Magenta and Cyan can be interchanged without any detrimental effects. The dot patterns for all four colors can be shuffled, but the visual appearance of the screens would change for the worse.

While these patterns produce excellent results when used with 300 line per inch laser xerography, they are also useful at other resolutions such as 240, 400, and 600 lines per inch. Also, there is no limitation to the number of dots per pattern. The best modes for other applications would include two-centered and ten-centered patterns. Finally, more than 64 pixels per pattern can be used. Generally, the more pixels there are in the pattern, the less contour patterning there is, and the closer an ideal angle can be approximated.

To summarize, this invention employs multi-center dots which are a combination of clustered dots and dithered dots. The highest frequency visual pattern is a clustered dot which has the desired features of printer stability and calibratability. The dots are implemented as a larger, lower frequency pattern in which the dot growth is dithered among the 4 dot centers, which reduces contour artifacts. The remaining texture artifact which is usually visible can be reduced by using a write white system.

FIG. 14 is a set of diagrams illustrating the write white xerographic process. In this embodiment, the photoreceptor 20 of FIG. 14a is a selenium plate about 150 microns in thickness, the top surface of which is charged up to +1600 volts. Light is used to discharge parts of this area as shown in FIG. 14b, to create an image. In FIG. 14c, a development station charges toner to a negative potential and then dusts the photoreceptor with this toner. The toner will adhere only to the positively charged parts of the surface as shown. Finally, in FIG. 14d, the toner 21 is transferred and fused to the paper 22 to create the hard copy. This is the process used in the Xerox 125 and Xerox 126 x-ray systems, and is described in U.S. Pat. No. 4,770,964, which is incorporated herein by reference.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

I claim:

1. In a printing system, apparatus for producing a toner image on a photoreceptor comprising:
   means for scanning an image and producing therefrom a gray scale output,
   means for generating a multi-centered halftone screen,
   means for comparing said gray scale output and said multi-centered halftone screen and producing therefrom a halftone image signal,
   a photoreceptor comprising a surface which is charged to a voltage,
   a light beam generator for generating a scanning light beam which is turned ON and OFF in response to said halftone image signal, and for scanning said charged surface of said photoreceptor with said beam to create discharged areas on said photoreceptor suface which are the areas scanned when said beam is ON,
   toner which is charged to a voltage that will allow said toner to adhere to charged portions of said photoreceptor and not to adhere to discharged portions of said and
   means for applying said toner to said photoreceptor.

2. The system of claim 1 wherein said screen comprises either 64, 68 or 72 pixels and wherein said screen creates a line of dots which is at an angle with respect to the image x or y axes at either plus or minus 14 or 45 degrees.

* * * * *